US010831890B2

(12) United States Patent
Rane (10) Patent No.: US 10,831,890 B2
(45) Date of Patent: Nov. 10, 2020

(54) METHOD AND SYSTEM FOR DETECTING ATTACKS ON CYBER-PHYSICAL SYSTEMS USING REDUNDANT DEVICES AND SMART CONTRACTS

(71) Applicant: Palo Alto Research Center Incorporated, Palo Alto, CA (US)

(72) Inventor: Shantanu Rane, Menlo Park, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 235 days.

(21) Appl. No.: 15/709,259

(22) Filed: Sep. 19, 2017

(65) Prior Publication Data

US 2019/0087571 A1 Mar. 21, 2019

(51) Int. Cl.
*G06F 21/56* (2013.01)
*G06F 21/55* (2013.01)
*H04L 29/06* (2006.01)

(52) U.S. Cl.
CPC .......... *G06F 21/56* (2013.01); *G06F 21/554* (2013.01); *H04L 63/1408* (2013.01); *H04L 63/1441* (2013.01); *H04L 63/1466* (2013.01); *H04L 63/18* (2013.01)

(58) Field of Classification Search
CPC ............ H04L 63/1408; H04L 63/1441; H04L 63/1466; H04L 63/18; G06F 21/554; G06F 21/56

See application file for complete search history.

(56) References Cited

U.S. PATENT DOCUMENTS

| 6,047,222 | A  | * | 4/2000  | Burns   | G05B 19/4184 |
|-----------|----|---|---------|---------|--------------|
|           |    |   |         |         | 700/2        |
| 9,276,946 | B2 | * | 3/2016  | Coates  | G06F 16/285  |
| 9,494,933 | B1 | * | 11/2016 | Jackson | H04L 41/0853 |
| 10,129,290| B2 | * | 11/2018 | Thomas  | H04L 63/1416 |

(Continued)

FOREIGN PATENT DOCUMENTS

EP 0931284 A1 7/1999

OTHER PUBLICATIONS

P. M. Laso, D. Brosset and J. Puentes, "Analysis of quality measurements to categorize anomalies in sensor systems," 2017 Computing Conference, London, 2017, pp. 1330-1338. (Year: 2017).*

(Continued)

*Primary Examiner* — Kari L Schmidt
(74) *Attorney, Agent, or Firm* — Shun Yao; Park, Vaughan, Fleming & Dowler LLP (57) ABSTRACT

One embodiment facilitates detection of attacks in a cyber-physical system of interacting elements with physical inputs and outputs. During operation, the system receives, by a first entity of a plurality of entities, a first reading from a first set of sensors of the cyber-physical system via a first network. The system receives, by the first entity, a second reading from a second set of sensors of the cyber-physical system via a second network, wherein the second network includes security measures which prevent access by any external entity or any of the plurality of entities. The system executes a set of instructions based on the first reading and the second reading. The system determines that a result of the executed instructions does not match an expected condition. The system performs a remedial action based on the result.

20 Claims, 6 Drawing Sheets

(56) References Cited

U.S. PATENT DOCUMENTS

| | | | | |
|---|---|---|---|---|
| 10,567,405 | B1* | 2/2020 | Aziz | H04L 63/0245 |
| 10,686,799 | B2* | 6/2020 | Kelly | H04L 9/3239 |
| 2006/0212932 | A1* | 9/2006 | Patrick | H04L 63/1441 |
| | | | | 726/11 |
| 2008/0016569 | A1* | 1/2008 | Hammer | G06F 21/554 |
| | | | | 726/23 |
| 2011/0039237 | A1* | 2/2011 | Skare | G06F 21/577 |
| | | | | 434/118 |
| 2011/0264608 | A1* | 10/2011 | Gonsalves | G06N 7/005 |
| | | | | 706/10 |
| 2012/0143981 | A1* | 6/2012 | Ku | H04L 67/12 |
| | | | | 709/217 |
| 2013/0097662 | A1* | 4/2013 | Pearcy | H04L 63/20 |
| | | | | 726/1 |
| 2014/0373140 | A1* | 12/2014 | Waters, Jr. | H04L 63/1458 |
| | | | | 726/22 |
| 2016/0065603 | A1* | 3/2016 | Dekel | H04L 63/14 |
| | | | | 726/23 |
| 2016/0275461 | A1* | 9/2016 | Sprague | G06Q 20/0655 |
| 2017/0006135 | A1* | 1/2017 | Siebel | H04L 67/02 |
| 2017/0046689 | A1 | 2/2017 | Lohe et al. | |
| 2017/0046806 | A1* | 2/2017 | Haldenby | G06Q 20/0655 |
| 2017/0103468 | A1* | 4/2017 | Orsini | G06Q 40/12 |
| 2017/0142144 | A1* | 5/2017 | Weinberger | H04L 63/0236 |
| 2017/0279818 | A1* | 9/2017 | Milazzo | H04L 63/1416 |
| 2018/0004948 | A1* | 1/2018 | Martin | G06F 21/566 |
| 2018/0025135 | A1* | 1/2018 | Odom | G06F 21/121 |
| | | | | 726/28 |
| 2018/0137465 | A1* | 5/2018 | Batra | G06Q 10/103 |
| 2018/0234422 | A1* | 8/2018 | Odom | H04L 63/10 |
| 2018/0285996 | A1* | 10/2018 | Ma | G06Q 50/184 |
| 2018/0307841 | A1* | 10/2018 | Kim | G06F 11/1641 |
| 2018/0337769 | A1* | 11/2018 | Gleichauf | H04L 9/3239 |
| 2018/0341931 | A1* | 11/2018 | Myshkin | H04L 9/0894 |
| 2019/0020665 | A1* | 1/2019 | Surcouf | H04L 67/10 |
| 2019/0068618 | A1* | 2/2019 | Mestha | H04L 63/1416 |
| 2019/0334920 | A1* | 10/2019 | Kelly | H04L 9/3239 |
| 2019/0342343 | A1* | 11/2019 | Parthasarathi | H04L 63/1408 |
| 2020/0084242 | A1* | 3/2020 | Katragadda | G06F 21/6245 |
| 2020/0099531 | A1* | 3/2020 | Chidambaram | G06Q 20/3674 |
| 2020/0099698 | A1* | 3/2020 | Kundu | G06F 21/64 |
| 2020/0177372 | A1* | 6/2020 | Bhamidipati | H04L 41/22 |

OTHER PUBLICATIONS

Ruchkin, Ivan, et al. "Eliminating inter-domain vulnerabilities in cyber-physical systems: An analysis contracts approach." Proceedings of the First ACM Workshop on Cyber-Physical Systems-Security and/or PrivaCy. 2015, pp. 11-22. (Year: 2015).*

S. A. Seshia, S. Hu, W. Li and Q. Zhu, "Design Automation of Cyber-Physical Systems: Challenges, Advances, and Opportunities," in IEEE Transactions on Computer-Aided Design of Integrated Circuits and Systems, vol. 36, No. 9, pp. 1421-1434, Sep. 2017. (Year: 2017).*

Wikipedia: "Cyber-Physical System", Sep. 5, 2017, URL: https://en.wikipedia.org/w/index.php?title=Cyber-physical_system&oldid=799040403 [retrieved on Dec. 20, 2018] *p. 1.*

* cited by examiner

METHOD AND SYSTEM FOR DETECTING ATTACKS ON CYBER-PHYSICAL SYSTEMS USING REDUNDANT DEVICES AND SMART CONTRACTS

BACKGROUND

Field

This disclosure is generally related to the detection of attacks on cyber-physical systems. More specifically, this disclosure is related to a method and system for detecting attacks on cyber-physical systems using redundant devices and smart contracts.

Related Art

A cyber-physical system includes physical and software/computational components, in a network of interacting elements with physical input and output rather than stand-alone devices. A cyber-physical system can include control systems and infrastructures for, e.g., an electric power grid, hydroelectric power plants, building environmental control systems, robotics systems, and aircraft systems. An attack on a cyber-physical system may target a physical process by modifying the functioning of sensors, actuators, and control modules involved in the physical process. For example, an attacker may hack a gas pressure gauge in a power plant by physically increasing the amount of gas pumped into a certain cylinder while at the same time deceptively causing ("spoofing") the actual gauge reading to read at a normal level. This spoof attack may prevent a plant operator or monitoring system from detecting the actual increased amount of gas, which may result in a safety hazard.

Current approaches to detecting such attacks rely on examining telemetry originating from, e.g., sensors, and sent to a control station. A plant operator at the control station may be alerted when a sensor reading outside a prescribed tolerance is detected, which may indicate the presence of a possible attack. However, as described above, a sophisticated attacker may modify the behavior of the sensor so that the telemetry emerging from the sensor mimics normal behavior, which can prevent the plant operator from detecting a potential safety hazard.

One approach to address the problem of detecting such an attack is to use redundant sensors. However, because many of these redundant sensors still communicate with the plant operator over the same network, an attacker who hacks into the network can still spoof the redundant sensors. Even the use of a redundant network generally involves communication with the plant operator. The system may thus still be hacked with respect to the plant operator. This can lead to dire consequences for the entire cyber-physical system and control environment.

SUMMARY

One embodiment facilitates detection of attacks in a cyber-physical system of interacting elements with physical inputs and outputs. During operation, the system receives, by a first entity of a plurality of entities, a first reading from a first set of sensors of the cyber-physical system via a first network. The system receives, by the first entity, a second reading from a second set of sensors of the cyber-physical system via a second network, wherein the second network includes security measures which prevent access by any external entity or any of the plurality of entities. The system executes a set of instructions based on the first reading and the second reading. The system determines that a result of the executed instructions does not match an expected condition. The system performs a remedial action based on the result.

In some embodiments, the first set of sensors is operating on the first network, the second set of sensors is a set of redundant sensors for the first set of sensors, and the second set of sensors are operating on the second network, which is a redundant network for the first network. The first reading and the second reading indicate physical measurements used as inputs by the first entity in executing the set of instructions, and the result of the executed instructions is an output used for modifying a block chain.

In some embodiments, the first reading and the second reading are received by other entities. The set of instructions is a smart contract, and the smart contract is executed by the other entities. Each entity of the plurality of entities performs operations on a block chain. In response to determining a consensus of the result of the executed smart contract by a majority of the plurality of entities, the system writes the result to a block chain.

In some embodiments, the system generates, by the first entity or another entity which determines that the result of the executed smart contract does not match the expected condition, a notification of an unexpected condition. The remedial action is performed by the first entity or the other entity.

In some embodiments, the entities are distributed entities which communicate with each other.

In some embodiments, executing the set of instructions further involves computing a function based on the first reading and the second reading.

In some embodiments, each entity of the plurality of entities maintains a data structure with entries which include one or more of: an identifier for a respective entity; a result of the set of instructions executed by the respective entity; a timestamp associated with the respective entity executing the instructions; and an indicator of whether the result of the instructions executed by the respective entity matches the expected condition.

In some embodiments, the expected condition is based one on or more of: receiving the first reading and the second reading within a predetermined time interval; whether the first reading and the second reading are equal; whether the first reading and the second reading are within a predetermined range; whether a function performed based on the first reading and the second reading yields a result within a predetermined range; whether the first reading and the second reading indicate a same physical quantity; whether the first reading and the second reading indicate a different physical quantity; and a change in device settings, firmware, or software associated with the first set of sensors and the second set of sensors.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention addresses the issues involved in detecting attacks on a cyber-physical system by using redundant sensors operating on a redundant network, and by executing smart contracts among distributed entities based on a block chain technology. An attack on a cyber-physical system may target a physical process of an interacting element of the cyber-physical system. The attack may modify the functioning of sensors, actuators, and control modules involved in the physical process. Current approaches to detecting such an attack rely on examining telemetry originating from, e.g., sensors, and sent to a control station. A plant operator at the control station may be alerted when a sensor reading outside a prescribed tolerance is detected, which may indicate the presence of a possible attack. However, a sophisticated attacker may modify (e.g., hack) the behavior of the sensor so that the telemetry emerging from the sensor mimics (e.g., spoofs) normal behavior, which can prevent the plant operator from detecting a potential safety hazard.

One approach to the problem of detecting such an attack is to use redundant sensors. However, because many of these redundant sensors still communicate with the plant operator over the same network, an attacker who hacks into the network can still spoof the redundant sensors. Even the use of a redundant network generally involves communication with the plant operator. The system may thus still be hacked with respect to the plant operator. This can lead to dire consequences for the entire cyber-physical system and control environment.

Embodiments of the present invention address this problem by providing a system with a primary set of sensors operating on a first network, and a redundant set of sensors operating a second network, where the second network includes security measures which prevent access by an external entity. The primary and redundant sensors read and measure certain parameters of a physical process, and send these readings not only to a control station, but to multiple stakeholders. These stakeholders may be entities in a distributed system, in that an entity has some way of communicating with the other entities. For example, in the case of a nuclear power plant, the stakeholders may include the plant operator, regional officials, a federal organization, and a government or a civilian watch-dog organization.

Each stakeholder (or associated device) can include a processor that operates in a permissioned block chain setting. The block chain can be a technical means for achieving a distributed consensus among mutually untrusting parties. The block chain allows each stakeholder to write data received from devices in the control system (e.g., sensors in an electric power plant). The block chain also allows a stakeholder to sign and write data into blocks, and can further encrypt the data. Examples of data which may be written to the block chain by a stakeholder include: primary sensor readings and actuator actions at regular time intervals; redundant sensor readings at regular time intervals; firmware upgrades on sensors, actuators, and controller modules; and instances at which observed behavior of the system deviates from the expected behavior, and a duration for which the deviation occurs.

Furthermore, each stakeholder can execute a copy of the same smart contract, which is a program or a set of instructions that runs on the block chain. At a high level, each stakeholder can receive, via two separate networks, a first reading from the primary sensors, and a second reading from the redundant sensors. Each stakeholder can execute the smart contract by using as input the first reading and the second reading. For example, a stakeholder can evaluate a mathematical function of the first reading and the second reading. Each stakeholder can then compare the result of the executed smart contract with an expected condition. If the result does not match the expected condition, the stakeholder can perform a remedial action. This remedial action may differ depending on many variables, including the type of stakeholder, a time interval, prescribed tolerances, a history of prior similar results, etc.

Because each stakeholder executes the same smart contract in the same way (i.e., by executing the same set of instructions on the same input), any single stakeholder may determine a discrepancy and immediately perform a remedial action. In addition, once a consensus on the result has been reached by a majority of the stakeholders, the result may be written to the block chain by any of the entities.

Thus, embodiments of the present invention provide a system which addresses the issues involved in detecting attacks on a cyber-physical system, where the improvements are fundamentally technological. The system provides a technological solution (e.g., using redundant sensors operating on a redundant network, and using smart contracts among distributed entities based on a block chain) to the technological problem of efficiently detecting attacks on a cyber-physical system.

More specifically, the block chain-based consensus allows any single stakeholder to detect an attack. For example, if a plant operator fails to notice the attack within an appropriate time, or if the plant operator is in some way compromised by the attack, any other stakeholder can detect the attack by executing the same smart contract using the same input. Furthermore, the redundant sensors are operating on a redundant network which is not communicating with the control station. This may protect the system from a large class of attacks to which industrial control systems (e.g., SCADA systems) are vulnerable. Finally, the redundant sensors provide an orthogonal view of the attack surface, such that the attack may be detected even if the attacker spoofs the telemetry from the primary sensors, and has deceived the control station into believing that the system is functioning normally.

Exemplary Network and Communication

Figure 1:
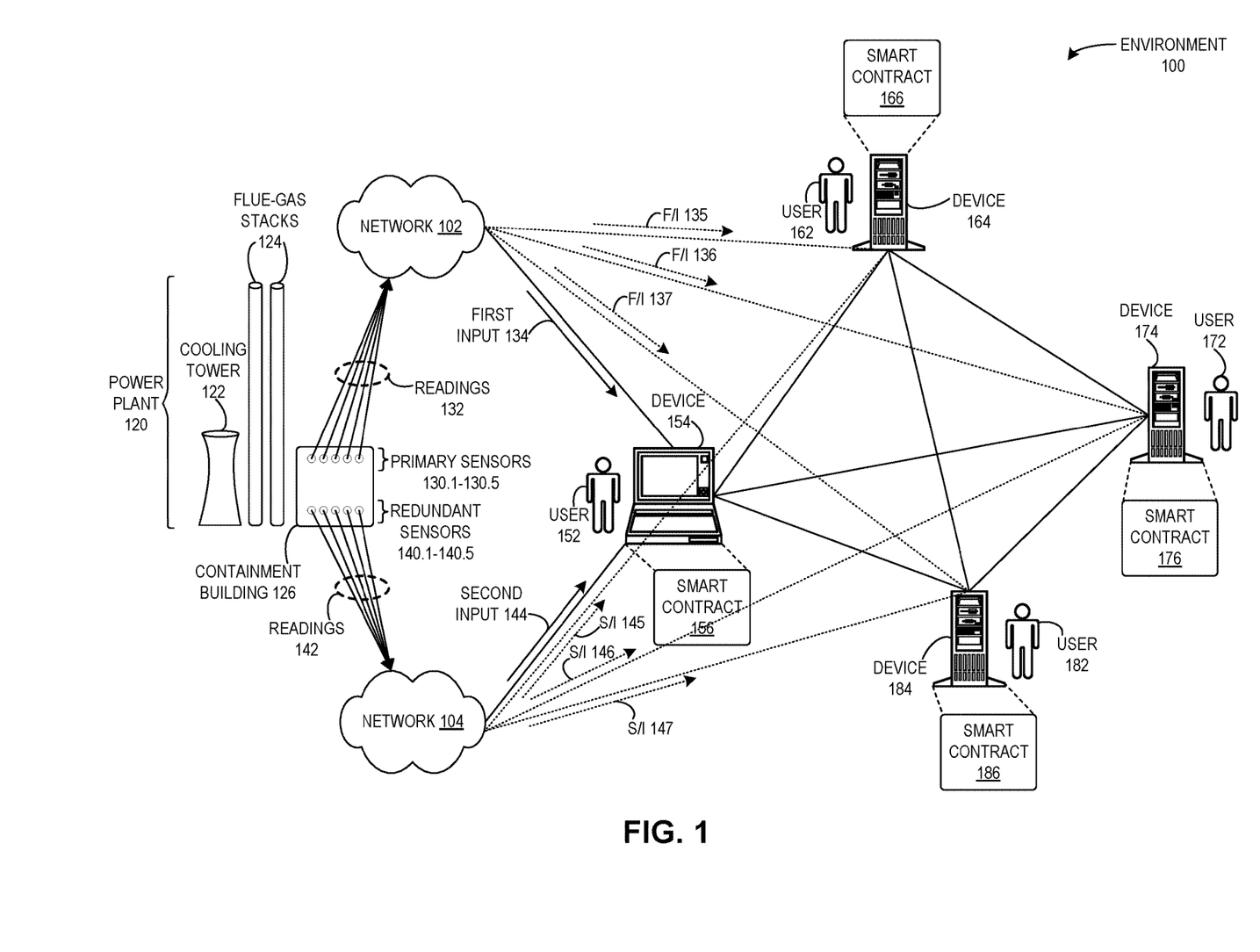
FIG. 1 illustrates an exemplary environment for facilitating detection of attacks in a cyber-physical system, in accordance with an embodiment of the present invention.

FIG. 1 illustrates an exemplary environment 100 for facilitating detection of attacks in a cyber-physical system, in accordance with an embodiment of the present invention. Environment 100 can include an industrial plant, such as a power plant 120, including a cooling tower 122, flue-gas stacks 124, and a containment building 126. Building 126 can include physical equipment measured by primary sensors 130.1-130.5 which operate on a first network 102, and by redundant sensors 140.1-140.5 which operate on a second network 104. Network 102 may be accessible by, e.g., a plant operator, while network 104 may include security measures which prevent access by any external entity or any of the distributed entities (including the plant operator).

Environment 100 can also include a plurality of distributed entities: a device 154 associated with a user 152; a device 164 associated with a user 162; a device 174 associated with a user 172; and a device 184 associated with a user 182. These entities may include multiple stakeholders interested in the operation of power plant 120. For example, user 152 may represent a plant operator, user 162 may represent a regional agency, user 172 may represent a federal organization, and user 182 may represent a civilian watchdog agency. Each entity can have a processor that executes a set of instructions, e.g., a smart contract. That is, device 154 can execute a smart contract 156, device 164 can execute a smart contract 166, device 174 can execute a smart contract 176, and device 184 can execute a smart contract 186. The plurality of distributed entities may communicate with each other either directly or via another distributed entity.

Environment 100 also illustrates a cyber-physical system of interacting elements with physical inputs and output. For example, the equipment in containment building 126 interacts via the primary and redundant sensors with the distributed entities (e.g., the multiple stakeholders). The cyber-physical system uses physical inputs of readings measured by the sensors, and yielding outputs of smart contracts executed by the distributed entities.

During operation, primary sensors 130.1-130.5 may take readings, and send readings 132 via network 102 as a first input 134 to a distributed entity, such as device 154. At the same or a similar time, redundant sensors 140.1-140.5 may take redundant readings (discussed below in further detail), and send readings 142 via network 104 as a second input 144 to, e.g., device 154. Note that the first and second inputs may be sent directly to each of the entities, or to one or more of the entities. For example, as shown by the dashed lines, first inputs ("F/I") 135, 136, and 137 may also be sent via network 102, respectively, to devices 164, 174, and 184, and second inputs ("S/I") 145, 146, and 147 may also be sent via network 104, respectively, to devices 164, 174, and 184. Thus, the first and second inputs may be sent, respectively, via networks 102 and 104, directly to each entity, or to one or more of the entities. Furthermore, the first and second input may be sent to an entity via a first receiving entity or any other distributed entity.

Each entity can then execute its copy of the smart contract using the first and second inputs. Any entity which determines that a result of the executed smart contract does not match an expected condition can perform a remedial action. For example, device 154 can execute its smart contract 156 based on first input 134 and second input 144, and determine that the result of the executed smart contract 156 does not match an expected condition. Device 154 (or user 152) can subsequently perform a remedial action. These operations are described below in relation to FIGS. 4 and 5.

Furthermore, any entity may determine a consensus of the result of the executed smart contract by a majority of the other entities, and write the result to the block chain. Maintaining a data structure to determine consensus is described below in relation to FIG. 3, and writing the result to the block chain is described below in relation to FIG. 5.

In summary, environment 100 includes redundant sensors operating on a redundant network, where the plant operator is not in communication with the redundant network. Furthermore, environment 100 includes distributed entities (i.e., multiple stakeholders), which each receive the same input (from primary sensors and redundant sensors which are operating on separate networks), and which each execute the same smart contract on the same received input. Because the distributed entities use block chain technology to reach consensus and write an agreed-upon result to the block chain, any single entity may determine an unexpected condition and immediately take a remedial action.

Figure 2:
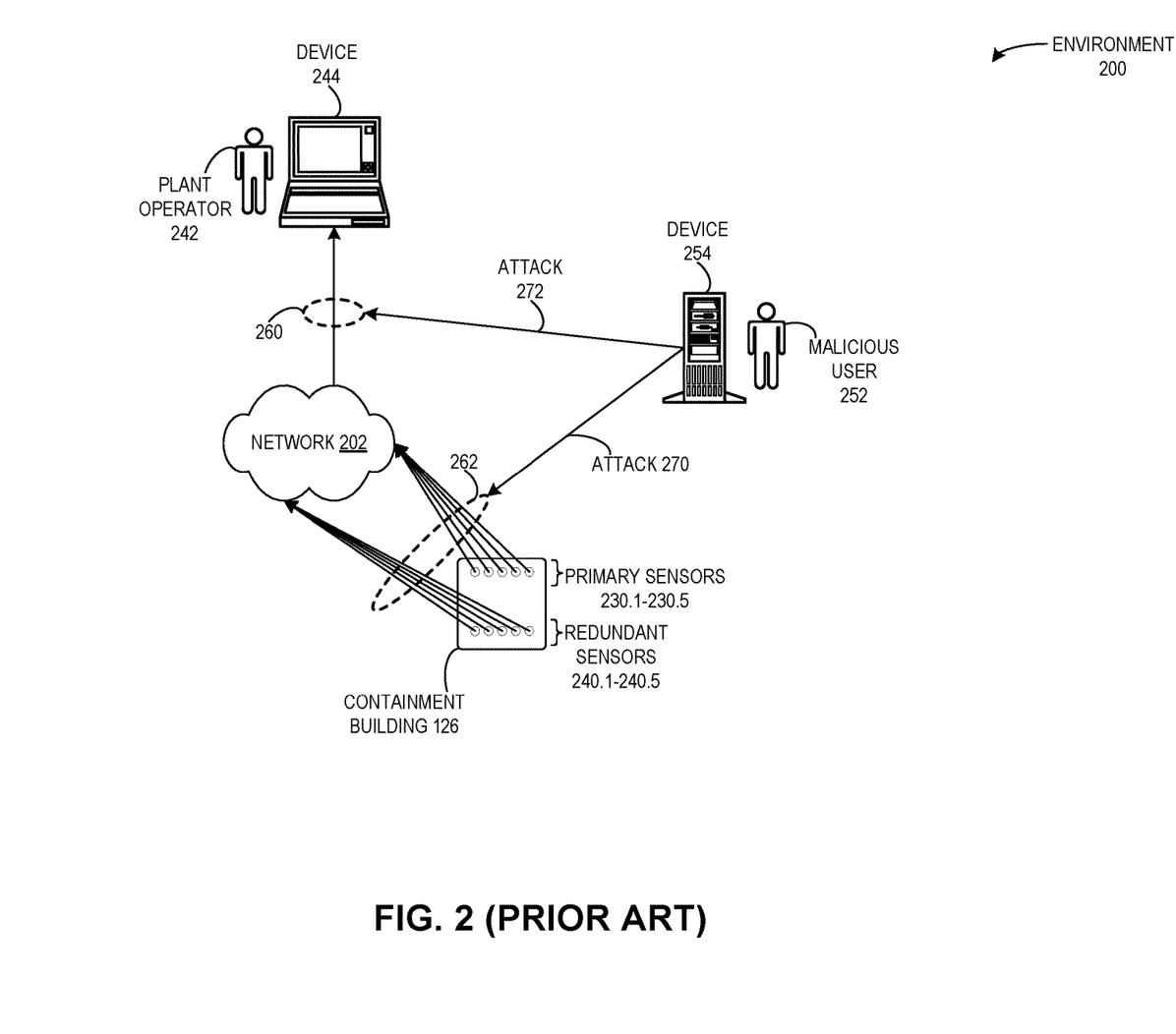
FIG. 2 illustrates an exemplary environment in the prior art.

In contrast, FIG. 2 illustrates an exemplary environment 200 in the prior art. Similar to environment 100, environment 200 includes containment building 126 with primary sensors 230.1-230.5 and redundant sensors 240.1-240.5. However, in contrast to environment 100, these sensors are operating on a same network 202, and are in communication with a plant operator 242 and an associated device 244 via network 202. A malicious user 252 via a device 254 may launch an attack 272 by spoofing data at a point 260, or an attack 270 by spoofing data at a point 262, where points 260 and 262 all belong to the same network communicating with plant operator 242. Thus, in prior art environment 200 of FIG. 2, the cyber-physical system which includes containment building 126 is vulnerable to attacks, unlike the embodiment described above in relation to environment 100 of FIG. 1.

Exemplary Distributed Entity and Data Structures

Figure 3:
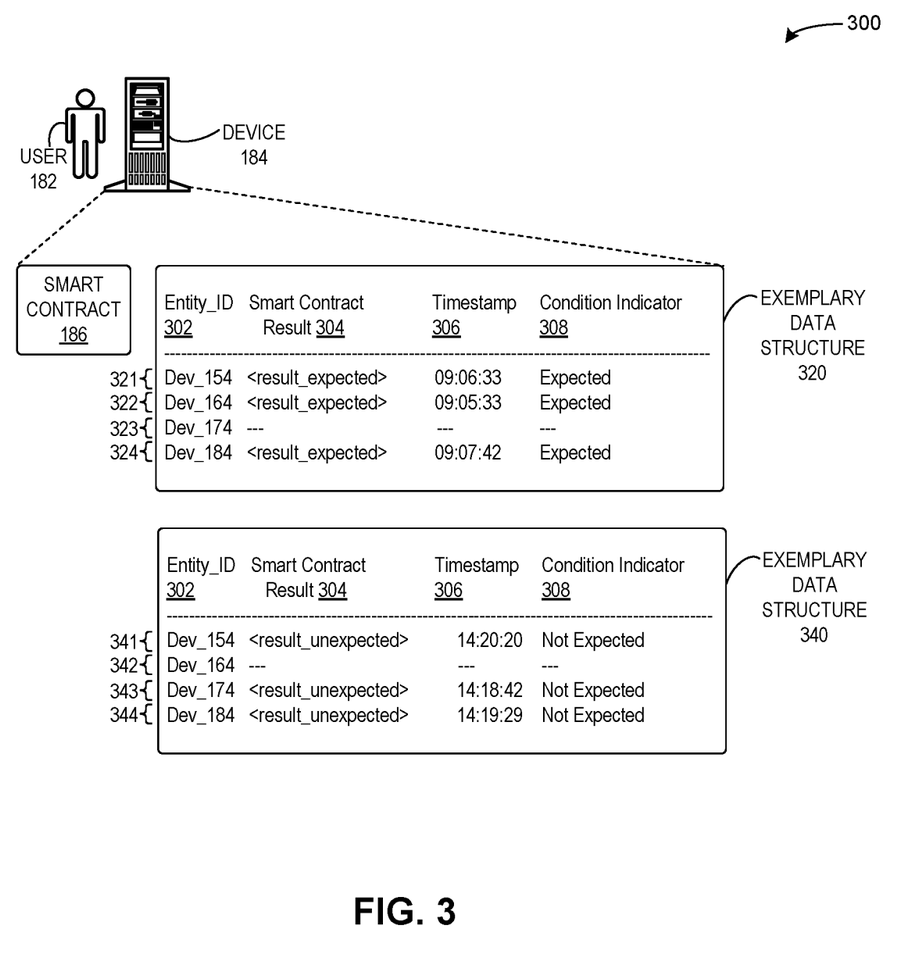
FIG. 3 presents an exemplary distributed entity, and exemplary data structures, in accordance with an embodiment of the present invention.

FIG. 3 presents an exemplary distributed entity 300, and exemplary data structures 320 and 340, in accordance with an embodiment of the present invention. Exemplary distributed entity 300 can include a device 184 and an associated user 182. Device 184 can include a smart contract 186, and a data structure which holds the status of the smart contract and the status of consensus for the result of the executed smart contract. For example, exemplary data structure 320 can include entries 321, 322, 323, and 324, where each entry includes: an entity identifier ("Entity_ID") 302 which identifies a respective entity; a smart contract result 304 which is the result of the respective entity executing the same smart contract on the same input (e.g., f(input1, input2)="<result_expected>" or "<result_unexpected>," where "input1" corresponds to a reading from a primary sensor and "input2" corresponds to a reading from a redundant sensor); a timestamp 306 indicating the time that the result was obtained or sent by the respective entity; and a condition indicator 308 of whether the result of the smart contract executed by the respective entity matches an expected condition (e.g., a flag that indicates whether the condition was "Expected" or "Not Expected"). In some embodiments, timestamp 306 can be a time window of a finite or repeating duration, e.g., a period of three minutes from 09:06:00 to 09:08:59.

Entries 321, 322, and 324 can indicate, for each respective entity, that an expected result was obtained by executing the smart contract, along with the corresponding timestamp. Entry 323 can be blank to indicate pending data, i.e., that device 174 has not yet executed the smart contract. Based on the data in entries 321, 322, and 324 of data structure 320, any of the involved entities may determine a consensus of the result by a majority of the entities (three out of four, in this case), and write the result to the block chain. The "majority" may be defined as a weighted majority, a number greater than one half of the number of entities, or any method that may be used to determine a consensus.

Exemplary data structure 340 can include entries 341, 342, 343, and 344, which can indicate, for each respective entity, that an unexpected result was obtained by executing the smart contract, along with the corresponding timestamp. Entry 342 can be blank to indicate pending data, i.e., that device 164 has not yet executed the smart contract. As described above in relation to data structure 320, any of the involved entities may determine a consensus of the result by a majority of the entities, and write the result to the block chain. Furthermore, any entity, upon obtaining the unexpected result, may perform a remedial action, including generating a notification for any of the other entities.

A "remedial action" can include a repair, a replacement, or a modification of the sensor, a physical object associated with the sensor, or any physical object or condition which may affect the sensor. A remedial action can also include an action which can prevent a future attack on a cyber-physical system, or an action associated with investigating a result of an executed smart contract which does not meet an expected condition. Each entity may perform a unique remedial action, which can depend on different parameters.

For example, an environmental watchdog may perform a remedial action of notifying a plant (e.g., sending a warning message or report) if a discrepancy between the primary sensor and the redundant sensor for a particular gas gauge falls outside of a predetermined range more than a certain number of times within a certain period (e.g., more than ten times in a 12-hour period). In contrast, a plant operator may perform a remedial action of investigating the same primary and redundant sensors (and corresponding physical and network elements) if it detects a similar discrepancy at an interval different from or shorter than the parameters for the environmental watchdog (e.g., more than three times in a 2-hour period).

Method for Facilitating Detection of Attacks in a Cyber-Physical System

Figure 4:
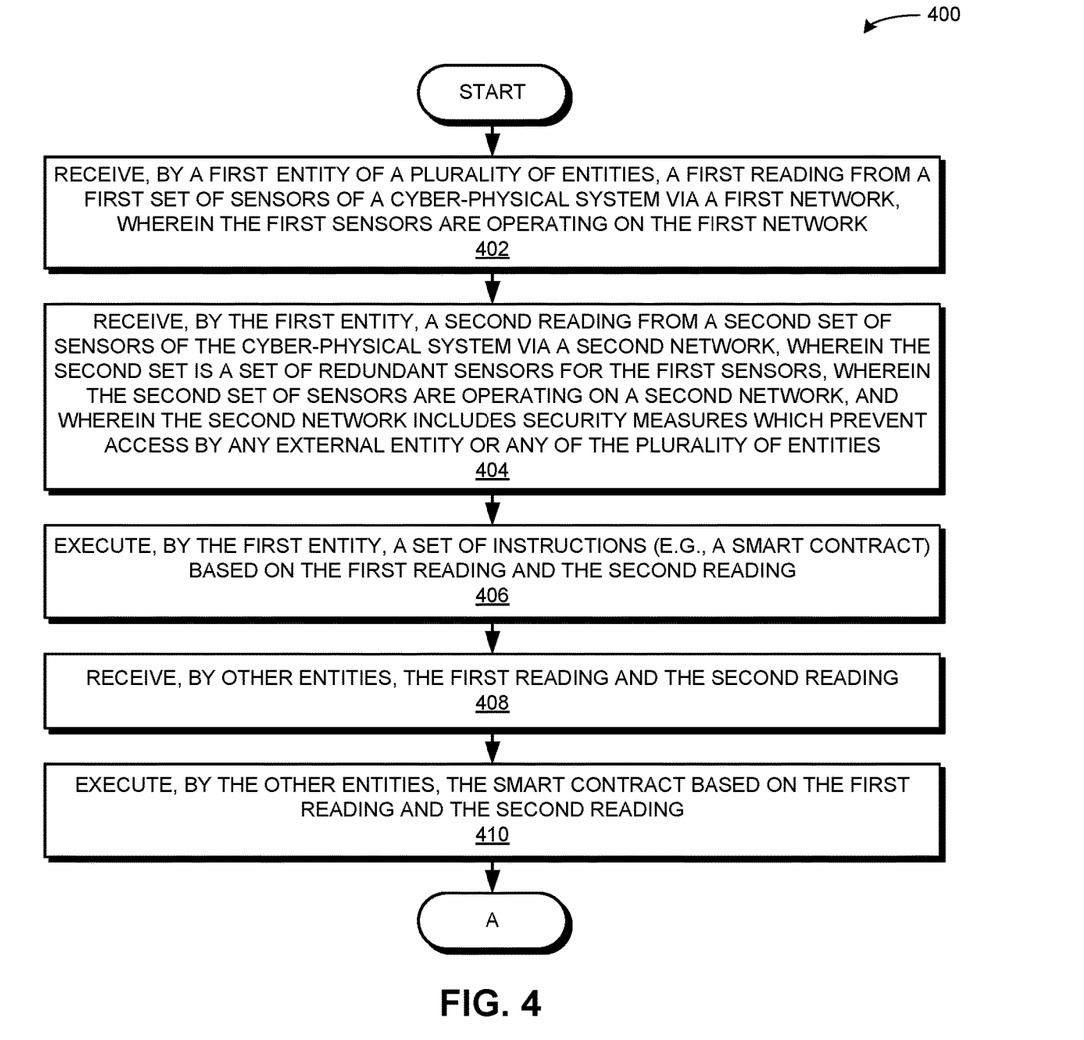
FIG. 4 presents a flow chart illustrating a method by a distributed entity for facilitating detection of attacks in a cyber-physical system, in accordance with an embodiment of the present invention.

FIG. 4 presents a flow chart 400 illustrating a method by a distributed entity for facilitating detection of attacks in a cyber-physical system, in accordance with an embodiment of the present invention. During operation, the system receives, by a first entity of a plurality of entities, a first reading from a first set of sensors of a cyber-physical system via a first network, wherein the first sensors are operating on the first network (operation 402). The system receives, by the first entity, a second reading from a second set of sensors of the cyber-physical system via a second network, wherein the second set is a set of redundant sensors for the first sensors, wherein the second set of sensors are operating on a second network, and wherein the second network includes security measures which prevent access by any external entity or any of the plurality of entities (operation 404). The second network is a redundant network for the first network.

The system executes, by the first entity, a set of instructions (e.g., a smart contract) based on the first reading and the second reading (operation 406). The system receives, by other entities, the first reading and the second reading (operation 408). The system executes, by the other entities, the smart contract based on the first reading and the second reading (operation 410), and the operation continues as described at Label A of FIG. 5.

Figure 5:
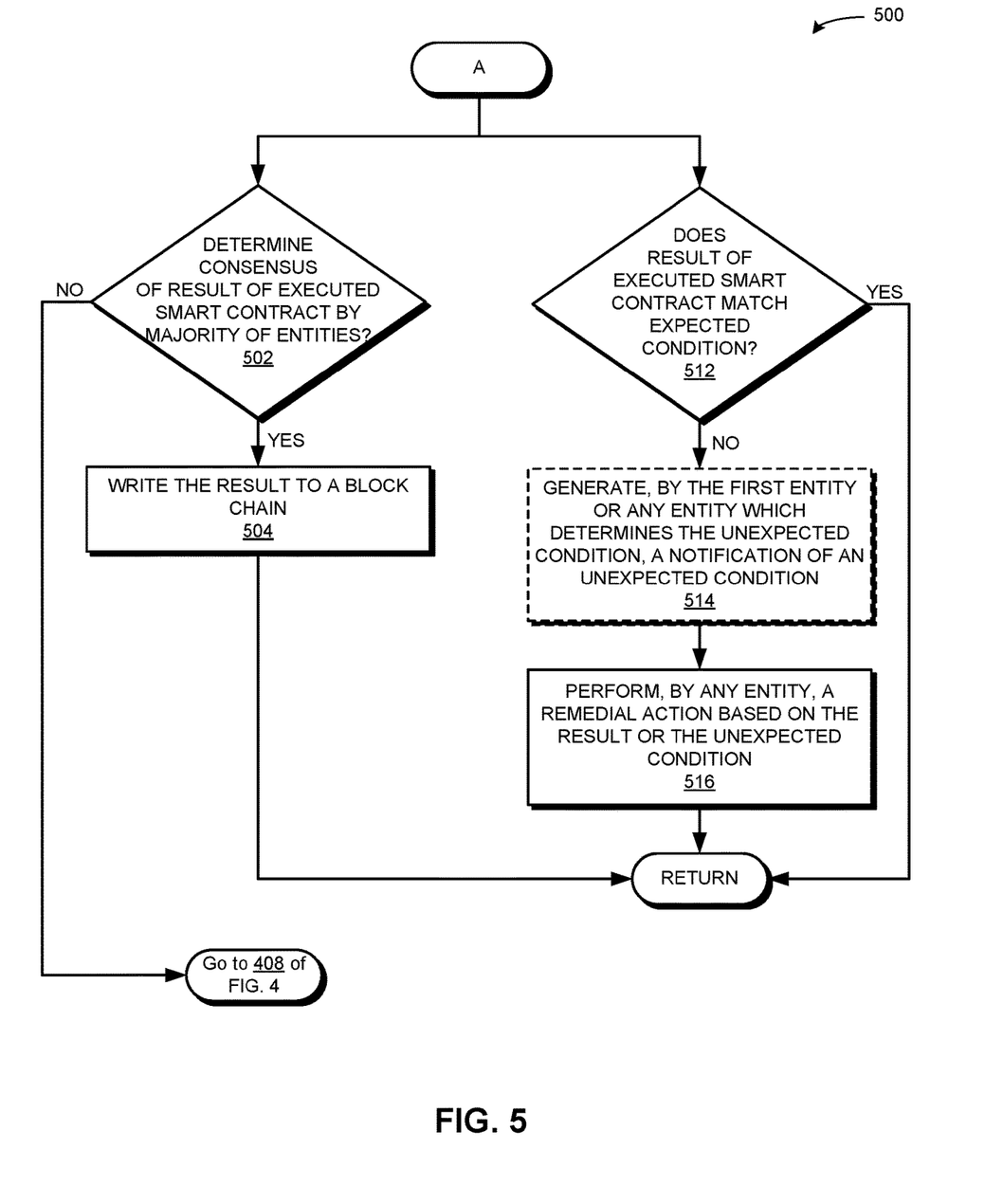
FIG. 5 presents a flow chart illustrating a method by a distributed entity for facilitating detection of attacks in a cyber-physical system, in accordance with an embodiment of the present invention.

FIG. 5 presents a flow chart 500 illustrating a method by a distributed entity for facilitating detection of attacks in a cyber-physical system, in accordance with an embodiment of the present invention. During operation, the system determines a consensus of the result of the executed smart contract by a majority of the entities (decision 502). If the system does not determine a consensus, the operation continues as described at operation 408 of FIG. 4. If the system does determine a consensus, the system writes the result to a block chain (operation 504). The result can be indicated as described above in exemplary data structures 320 and 340 of FIG. 3 (e.g., in smart contract result field 304). Note that any of the distributed entities can determine the consensus and write the result to the block chain.

The system can also determine if the result of the executed smart contract matches an expected condition (decision 512). The expected condition can be based on, e.g.: receiving the first reading and the second reading within a predetermined interval; whether the first reading and the second reading are equal; whether the first reading and the second reading are within a predetermined range; whether a function performed based on the first reading and the second reading yields a result within a predetermined range; whether the first reading and the second reading indicate a same physical quantity; whether the first reading and the second reading indicate a different physical quantity; and a change in device settings, firmware, or software associated with the first sensors and the second sensors. An indicator of whether an expected condition is met can be included in condition indicator field 308, as described above in relation to FIG. 3.

If the result matches an expected condition (decision 512), the operation returns. If the result does not match an expected condition (decision 512), the system can optionally generate, by the first entity or any entity which determines the unexpected condition, a notification of the unexpected condition (operation 514). Determining the unexpected condition is determining that the result of the executed smart contract does not match an expected condition. The system can subsequently perform, by any entity, a remedial action based on the unexpected condition (operation 516).

Exemplary Computer and Communication System

Figure 6:
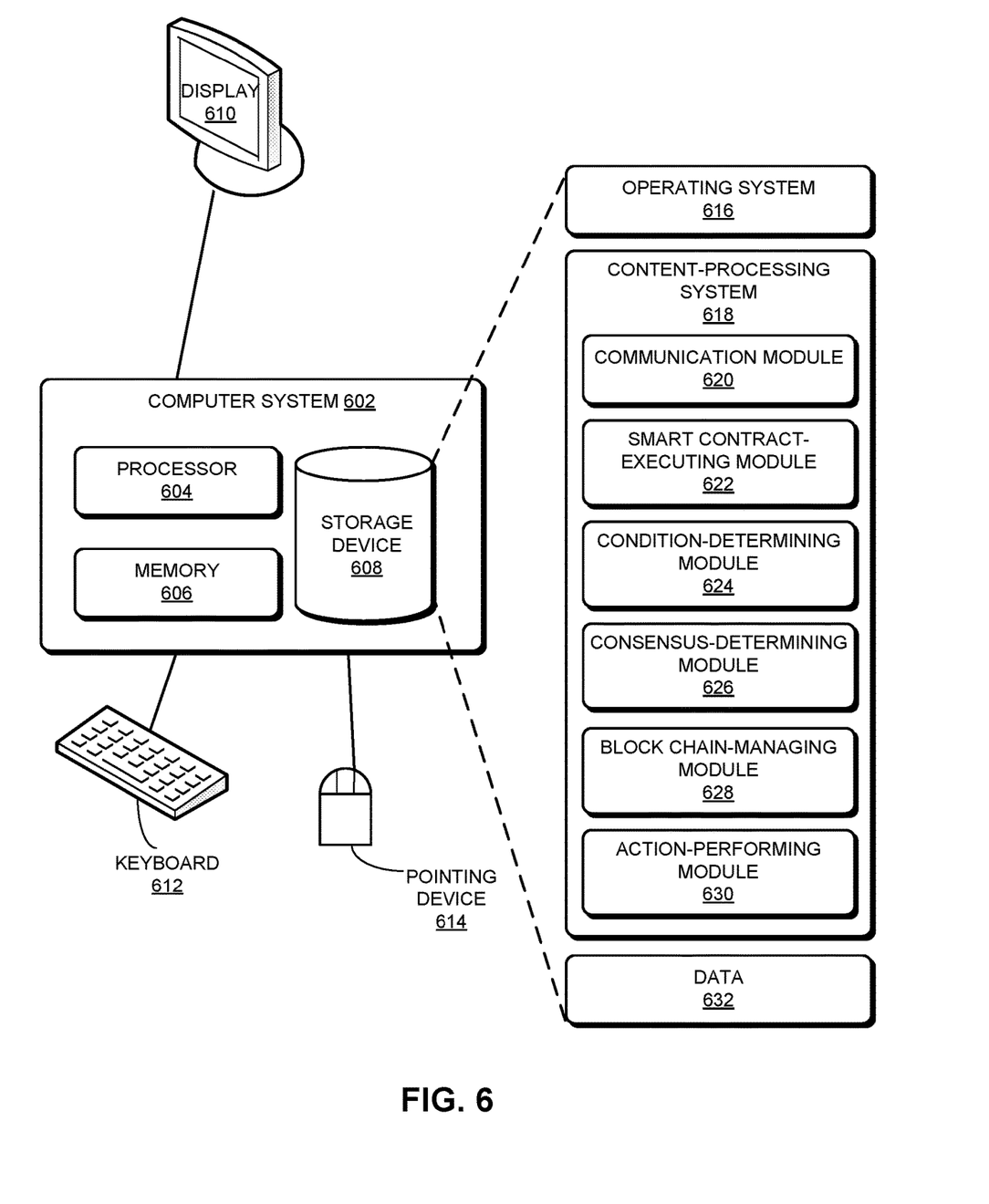
FIG. 6 illustrates an exemplary distributed computer and communication system that facilitates detection of attacks in a cyber-physical system, in accordance with an embodiment of the present invention.

FIG. 6 illustrates an exemplary distributed computer and communication system 602 that facilitates detection of attacks in a cyber-physical system, in accordance with an embodiment of the present invention. Computer system 602 includes a processor 604, a memory 606, and a storage device 608. Memory 606 can include a volatile memory (e.g., RAM) that serves as a managed memory, and can be used to store one or more memory pools. Furthermore, computer system 602 can be coupled to a display device 610, a keyboard 612, and a pointing device 614. Storage device 608 can store an operating system 616, a content-processing system 618, and data 632.

Content-processing system 618 can include instructions, which when executed by computer system 602, can cause computer system 602 to perform methods and/or processes described in this disclosure. Specifically, content-processing system 618 may include instructions for sending and/or receiving data packets to/from other network nodes across a computer network (communication module 620). A data packet can include a message that indicates data, encrypted data, and readings from a sensor, actuator, or controller module of a cyber-physical system.

Content-processing system 618 can include instructions for receiving, by a first entity of a plurality of entities, a first reading from a first set of sensors of the cyber-physical system via a first network (communication module 620). Content-processing system 618 can include instructions for receiving, by the first entity, a second reading from a second set of sensors of the cyber-physical system via a second network (communication module 620). Content-processing system 618 can include instructions for executing a set of instructions based on the first reading and the second reading (smart contract-executing module 622). Content-processing system 618 can include instructions for determining that a result of the executed instructions does not match an expected condition (condition-determining module 624). Content-processing system 618 can include instructions for performing a remedial action based on the result (action-performing module 630).

Content-processing system 618 can include instructions for, in response to determining a consensus of the result of the executed smart contract by a majority of the plurality of entities (consensus-determining module 626), writing the result to a block chain (block chain-managing module 628). Content-processing system 618 can include instructions for computing a function based on the first reading and the second reading (smart contract-executing module 622).

Data 632 can include any data that is required as input or that is generated as output by the methods and/or processes described in this disclosure. Specifically, data 632 can store at least: an input; a reading; a reading which indicates a physical measurement or physical input; an output; a smart contract; a set of instructions; a result of an executed smart contract; a result of executing a set of instructions; an indicator of a network; an identifier or indicator for a sensor; a block chain; an indicator of a consensus; a notification; an expected condition; an indicator of a remedial action; a function; a data structure; entries in a data structure; an identifier for a respective entity; a result of a set of instructions or a smart contract executed by a respective entity; a timestamp associated with a respective entity executing a set of instructions or a smart contract; an indicator of whether a result of executed instruction or a smart contract matches an expected condition; a predetermined time interval; security-related parameters for a network; a predetermined range; a physical quantity; and a change in device settings, firmware, or software associated with a set of sensors.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating detection of attacks in a cyber-physical system of interacting elements with physical inputs and outputs, the method comprising:
    receiving, by a first entity of a plurality of entities, a first reading from a first set of sensors of the cyber-physical system via a first network;
    receiving, by the first entity, a second reading from a second set of sensors of the cyber-physical system via a second network,
    wherein the first reading and the second reading measure parameters of a same physical process,
    wherein the second set of sensors is distinct from the first set of sensors,
    wherein the second network includes security measures which prevent access by any external entity or any of the plurality of entities, and
    wherein the first reading and the second reading are received by other entities of the plurality of entities;
    executing, by the first entity and the other entities, a set of instructions which is a smart contract based on the first reading and the second reading;
    determining, by the first entity and the other entities, whether a result of the executed smart contract matches an expected condition based on at least a change in device settings, firmware, or software associated with the first set of sensors and the second set of sensors;
    responsive to determining a consensus of the result of the executed smart contract by a majority of the entities, writing the result to a block chain; and
    responsive to determining, by at least one of entities, that the result of the executed smart contract does not match the expected condition, performing a remedial action based on the result.

2. The method of claim 1, wherein the first set of sensors is operating on the first network, wherein the second set of sensors is a set of redundant sensors for the first set of sensors, wherein the second set of sensors are operating on the second network, which is a redundant network for the first network,
    wherein the first reading and the second reading indicate physical measurements used as inputs by the first entity in executing the set of instructions, and
    wherein the result of the executed instructions is an output used for modifying the block chain.

3. The method of claim 1, wherein each entity of the plurality of entities performs operations on the block chain.

4. The method of claim 1, further comprising:
    generating, by the first entity or another entity which determines that the result of the executed smart contract does not match the expected condition, a notification of an unexpected condition,
    wherein the remedial action is performed by the first entity or the other entity.

5. The method of claim 1, wherein the entities are distributed entities which communicate with each other.

6. The method of claim 1, wherein executing the set of instructions further involves computing a function based on the first reading and the second reading.

7. The method of claim 1, wherein each entity of the plurality of entities maintains a data structure with entries which include one or more of:
an identifier for a respective entity;
a result of the set of instructions executed by the respective entity;
a timestamp associated with the respective entity executing the instructions; and
an indicator of whether the result of the instructions executed by the respective entity matches the expected condition.

8. The method of claim 1, wherein the expected condition is based on one or more of:
receiving the first reading and the second reading within a predetermined time interval;
whether the first reading and the second reading are equal;
whether the first reading and the second reading are within a predetermined range;
whether a function performed based on the first reading and the second reading yields a result within a predetermined range;
whether the first reading and the second reading indicate a same physical quantity; and
whether the first reading and the second reading indicate a different physical quantity.

9. A computer system for facilitating detection of attacks in a cyber-physical system of interacting elements with physical inputs and outputs, the method comprising, the computer system comprising:
a processor; and
a storage device storing instructions that when executed by the processor cause the processor to perform a method, the method comprising:
receiving, by a first entity of a plurality of entities, a first reading from a first set of sensors of the cyber-physical system via a first network;
receiving, by the first entity, a second reading from a second set of sensors of the cyber-physical system via a second network,
wherein the first reading and the second reading measure parameters of a same physical process,
wherein the second set of sensors is distinct from the first set of sensors,
wherein the second network includes security measures which prevent access by any external entity or any of the plurality of entities, and
wherein the first reading and the second reading are received by other entities of the plurality of entities;
executing, by the first entity and the other entities, a set of instructions which is a smart contract based on the first reading and the second reading;
determining, by the first entity and the other entities, whether a result of the executed smart contract matches an expected condition based on at least a change in device settings, firmware, or software associated with the first set of sensors and the second set of sensors;
responsive to determining a consensus of the result of the executed smart contract by a majority of the entities, writing the result to a block chain; and
responsive to determining, by at least one of entities, that the result of the executed smart contract does not match the expected condition, performing a remedial action based on the result.

10. The computer system of claim 9, wherein the first set of sensors is operating on the first network, wherein the second set of sensors is a set of redundant sensors for the first set of sensors, wherein the second set of sensors are operating on the second network, which is a redundant network for the first network,
wherein the first reading and the second reading indicate physical measurements used as inputs by the first entity in executing the set of instructions, and
wherein the result of the executed instructions is an output used for modifying the block chain.

11. The computer system of claim 9, wherein each entity of the plurality of entities performs operations on the block chain.

12. The computer system of claim 9, wherein the method further comprises:
generating, by the first entity or another entity which determines that the result of the executed smart contract does not match the expected condition, a notification of an unexpected condition,
wherein the remedial action is performed by the first entity or the other entity.

13. The computer system of claim 9, wherein the entities are distributed entities which communicate with each other.

14. The computer system of claim 9, wherein executing the set of instructions further involves computing a function based on the first reading and the second reading.

15. The computer system of claim 9, wherein each entity of the plurality of entities maintains a data structure with entries which include one or more of:
an identifier for a respective entity;
a result of the set of instructions executed by the respective entity;
a timestamp associated with the respective entity executing the instructions; and
an indicator of whether the result of the instructions executed by the respective entity matches the expected condition.

16. The computer system of claim 9, wherein the expected condition is based on one or more of:
receiving the first reading and the second reading within a predetermined time interval;
whether the first reading and the second reading are equal;
whether the first reading and the second reading are within a predetermined range;
whether a function performed based on the first reading and the second reading yields a result within a predetermined range;
whether the first reading and the second reading indicate a same physical quantity; and
whether the first reading and the second reading indicate a different physical quantity.

17. A non-transitory computer-readable storage medium storing instructions that when executed by a computer cause the computer to perform a method which facilitates detection of attacks in a cyber-physical system of interacting elements with physical inputs and outputs, the method comprising:
receiving, by a first entity of a plurality of entities, a first reading from a first set of sensors of the cyber-physical system via a first network;

receiving, by the first entity, a second reading from a second set of sensors of the cyber-physical system via a second network,
wherein the first reading and the second reading measure parameters of a same physical process,
wherein the second set of sensors is distinct from the first set of sensors,
wherein the second network includes security measures which prevent access by any external entity or any of the plurality of entities, and
wherein the first reading and the second reading are received by other entities of the plurality of entities;
executing, by the first entity and the other entities, a set of instructions which is a smart contract based on the first reading and the second reading;
determining, by the first entity and the other entities, whether a result of the executed smart contract matches an expected condition based on at least a change in device settings, firmware, or software associated with the first set of sensors and the second set of sensors;
responsive to determining a consensus of the result of the executed smart contract by a majority of the entities, writing the result to a block chain; and
responsive to determining, by at least one of entities, that the result of the executed smart contract does not match the expected condition, performing a remedial action based on the result.

18. The storage medium of claim 17, wherein the first set of sensors is operating on the first network, wherein the second set of sensors is a set of redundant sensors for the first set of sensors, wherein the second set of sensors are operating on the second network, which is a redundant network for the first network,
wherein the first reading and the second reading indicate physical measurements used as inputs by the first entity in executing the set of instructions, and
wherein the result of the executed instructions is an output used for modifying the block chain.

19. The storage medium of claim 17, wherein each entity of the plurality of entities performs operations on the block chain.

20. The storage medium of claim 17, wherein the expected condition is based on one or more of:
receiving the first reading and the second reading within a predetermined time interval;
whether the first reading and the second reading are equal;
whether the first reading and the second reading are within a predetermined range;
whether a function performed based on the first reading and the second reading yields a result within a predetermined range;
whether the first reading and the second reading indicate a same physical quantity; and
whether the first reading and the second reading indicate a different physical quantity.

* * * * *